Patented July 21, 1931

1,815,379

UNITED STATES PATENT OFFICE

ROBERT D. PIKE, OF OAKLAND, CALIFORNIA

PROCESS FOR VOLATILIZATION OF PHOSPHORUS

No Drawing.  Application filed November 14, 1927. Serial No. 233,323.

My present invention relates to a process for volatilization of phosphoric acid from phosphate rock, and is characterized, in part, by the use of a blast furnace into which phosphate rock, a suitable flux, and coke are charged in lump form.

My invention consists in applying to a blast furnace, which is fed with phosphate rock, coke, and a fluxing material for substantially complete elimination of phosphorus by volatilization, an oxygenated blast in which the percent of oxygen by weight is greater than that occurring in the atmosphere but not more than 45%; and a preferable form of my invention is to heat the air constituent of the blast to about 700° C. and then to add to it, before passing to the tuyères, sufficient commercially pure oxygen to raise the oxygen in the blast to 30% by weight.

The blast furnace which I employ in my process is of the usual type employed in the manufacture of pig iron or ferro phosphorus. The materials are charged at the top and the slag is flushed from the bottom. The gas issuing from the top of the blast furnace contains most of the phosphorus which has been volatilized from the charge, as gaseous phosphorus, together with a little $P_2O_5$ which has been formed by oxidation of the gaseous phosphorus by $CO_2$ in the shaft of the furnace. The phosphorus can be collected as such under water by well known means, or it can be burned to $P_2O_5$ by introducing air into the top gases from the blast furnace. It is preferable to accomplish oxidation by introducing the necessary air into a combustion chamber through which the gases pass after leaving the blast furnace. The air for combustion will usually carry enough water vapour to hydrate the $P_2O_5$ to ortho phosphoric acid, but if such is not the case, sufficient water vapour must be introduced into the flue to make up for the deficiency. After combustion and humidification, the gases pass through a Cottrell precipitator or other suitable means for collecting the phosphoric acid which they contain. The only ferro phosphorus produced in my process is that made incidentally from the iron contained in the materials charged into the furnace, as it is the purpose of my process to effect a substantially complete elimination of phosphorus by volatilization.

In a typical case the materials charged into the furnace are so proportioned as to give a slag of the following composition:

|  | Per cent |
|---|---|
| CaO | 41.7 |
| $SiO_2$ | 41.0 |
| $Al_2O_3$ | 15.6 |
| MgO | 1.7 |

This particular slag was made by charging one part by weight of phosphate rock of the following composition:

|  | Per cent |
|---|---|
| CaO | 48.2 |
| $SiO_2$ | 4.2 |
| $Al_2O_3$ | 1.1 |
| MgO | .5 |
| $P_2O_5$ | 30.2 | with seven tenths (.7) by weight of a fluxing material of the following composition:

|  | Per cent |
|---|---|
| CaO | 3.9 |
| $SiO_2$ | 61.0 |
| $Al_2O_3$ | 22.5 |
| MgO | 2.3 |

With the above charge I add an amount of coke in separate charges to the furnace ranging from 70 to 80 pounds per 100 pounds of phosphate rock in the charge.

I find it preferable to reduce the fines in the charge to a minimum in order to avoid collecing dust with the phosphoric acid, and to that end I screen the fine material out of the phosphate rock and flux usually employing a screen with a ¾ inch opening for this purpose. This fine material, when mixed with an appropriate amount of coke, is sintered in a Dwight Lloyd sintering machine or other suitable form of apparatus and the sintered material is charged into the furnace together with the natural lump charge.

The reaction which takes place in the furnace is essentially a combination of the lime of the phosphate rock with the fluxing material forming a fluid slag and a reduction of the $P_2O_5$ to elemental phosphorus. The carbon in the gases leaving the bosh is as CO and this goes over partly to $CO_2$ and C in the upper part of the furnace shaft. This statement of the reaction indicates a close analogy to the overall reaction which takes place in the iron blast furnace, but there is a very important difference which introduces a difficulty which has hitherto baffled experimenters and which has up to this time made necessary the use of the electric furnace for volatilizing phosphorus in a commercially successful manner. This difference resides in the fact that the reduction of phosphates to elemental phosphorus by coke can only be accomplished commercially at a high temperature, ranging around 1500° C., and the reaction itself is highly endothermic and requires that a very large amount of heat be delivered to the reacting materials. The carbon monoxide which passes up the shaft of the furnace has little or no effect in reducing phosphates. On the other hand, in the iron blast furnace the iron oxid is mostly reduced to metallic iron in the shaft of the furnace, and the main reaction in the bosh is the melting of the iron and the slag, both of which reactions are far less endothermic than the reduction of phosphates to phosphorus. The difficulty referred to above results from the necessity of transferring the heat from the burning of coke to carbon monoxid to the reacting materials which are themselves at a very high temperature. The flow of heat demands a difference of temperature, or temperature head; and the amount of heat which flows quantitatively is the product of the temperature drop, the mass of the gas of combustion, and its specific heat.

I have found that in employing the blast furnace in carrying out my process the reduction of the $P_2O_5$ to phosphorus begins and is almost completed in the bosh of the furnace where the materials are in process of melting, and is finished in the hearth of the furnace. The pool of molten slag in the hearth of the furnace, so long as it remains at a temperature in excess of 1450° C., and so long as the conditions at its surface are strongly reducing, continues to give up vapors of phosphorus.

Summing up, I have found that the principal requirements for commercial smelting of phosphate rock with substantially complete elimination of phosphorus in the coke fired blast furnace are, first, a strong reducing condition in the hearth and bosh of the furnace; second, a source of heat energy at a sufficiently high temperature to cause energetic flow of heat into the reacting materials in the bosh and hearth, which are themselves at a temperature of about 1500° C.; third, in burning carbon to attain the heat energy the only heat energy which is available for this reaction is that resulting from burning the carbon to CO. Therefore, the temperature of combustion of the carbon to CO rather than to $CO_2$ under the conditions existing in the hearth and bosh of the furnace must be high enough to cause the necessary energetic flow of heat energy into the reacting materials. Fourth, a sufficient time of residence should be provided for the slag in the hearth of the furnace to eliminate the last practical traces of phosphorus, and this time of residence should not be less than two hours and should preferably be over four hours.

In ordinary iron blast furnace practice with the use of a blast at 650° C. the temperature of combustion of the carbon to carbon monoxid is about 1790° C. While it is true that this provides a temperature head of 290° C. for supplying heat to the reaction, I have found in practice that it is necessary to employ a higher temperature head, and I have discovered that if I use a cold blast containing 45% by weight of oxygen, or a hot blast at 650° C. containing 30% by weight of oxygen, I obtain a temperature head of over 600° C. and other conditions being suitable as specified, that I attain a commercially complete elimination of phosphorus, the slag containing less than 3% $P_2O_5$. This blast is obtained preferably by heating the air separately to about 700° C. and then mixing with it enough commercially pure oxygen to give a blast containing 30% oxygen by weight. When carbon is burned to CO by such a blast, the temperature of combustion is about 2120° C., showing a thermal head of 620° C. or more than twice as much as is obtainable with an ordinary hot air blast.

An important consequence of my invention in practice is that blast furnaces similar to iron blast furnaces may be employed for the commercial production of phosphorus as phosphoric acid, but that the height of the shaft used in my process may be much less for given hearth and bosh diameters than in standard iron blast furnace practice. This follows from the fact that the only function of the shaft in my process is for preheating the charge, and it only need be high enough to satisfactorily accomplish this purpose. The ratio of height to diameter need be only from one-third to one-half as great as in the iron blast furnace. This reduction in height leads to important savings in both construction and operation of a blast furnace.

It will be understood that many of the details concerning proportions, temperatures, etc., are subject to considerable variation without departing from the spirit of my invention, as disclosed in the appended claims.

Having thus described my invention, what I claim and desire to secure by Letters Patent is:

1. A single furnace method for the complete commercial volatilization of phosphorus from phosphate rock which consists in charging a blast furnace with phosphate rock, a flux to make a basic slag, a solid carbonaceous fuel, blasting the charge with a blast of air containing from 30% to 45% by weight of oxygen, regulating the furnace to a temperature on the hearth in excess of 1450° C., maintaining said temperature at least two hours, and allowing the slag to remain thereat from at least two to four hours.

2. A method for effecting substantially complete volatilization of phosphorus from phosphate rock, which consists in charging a blast furnace with phosphate rock, a flux, and solid carbonaceous fuel, the amount of said solid carbonaceous fuel being sufficient to furnish the necessary fuel for heat and carbon for the reduction of the oxides of phosphorus of the phosphate rock to phosphorus, and blasting the charge with a blast of hot air which has been oxygenated so as to contain not less than 30% of oxygen by weight, and allowing the slag to remain in the furnace for at least two to four hours.

3. A method for effecting substantially complete volatilization of phosphorus from phosphate rock, which consists in charging a blast furnace with phosphate rock, a flux, and solid carbonaceous fuel, the carbon therein ranging from 70 to 80 pounds per 100 pounds of phosphate rock in the charge, and blasting the charge with a blast of hot air which has been oxygenated so as to contain not less than 30% of oxygen by weight.

4. A method for effecting substantially complete volatilization of phosphorus from phosphate rock, which consists in charging a blast furnace with phosphate rock, a flux, and solid carbonaceous fuel, the carbon content thereof ranging from 2 to 3 pounds per pound of $P_2O_5$ in the charge, and blasting the charge with a blast of hot air which has been oxygenated so as to contain not less than 30% of oxygen by weight.

5. A single furnace method for the complete commercial volatilization of phosphorus from phosphate rock which consists in charging a blast furnace with phosphate rock, a flux to make a basic slag, using coke as fuel, blasting the charge with a blast of air containing from 30% to 45% by weight of oxygen, regulating the furnace to a temperature on the hearth in excess of 1450° C., and maintaining said temperature at least two hours and allowing the slag to remain thereat for at least 2 to 4 hours.

6. A method for effecting substantially complete volatilization of phosphorus from phosphate rock, which consists in charging a blast furnace with phosphate rock, a flux, and coke, the amount of said coke being sufficient to furnish the necessary fuel for heat and carbon for the reduction of the oxides of phosphorus of the phosphate rock to phosphorus; and blasting the charge with a blast of hot air which has been oxygenated so as to contain not less than 30% of oxygen by weight and allowing the slag to remain in the furnace for at least 2 to 4 hours.

7. A method for effecting substantially complete volatilization of phosphorous from phosphate rock, which consists in charging a blast furnace with phosphate rock, a flux, and coke, the proportion of said coke ranging from 70 to 80 pounds per 100 pounds of phosphate rock in the charge; and blasting the charge with a blast of hot air which has been oxygenated so as to contain not less than 30% of oxygen by weight.

8. A method for effecting substantially complete volatilization of phosphorus from phosphate rock, which consists in charging a blast furnace with phosphate rock, a flux, and coke, the coke containing 88% to 90% of carbon ranging from 2 to 3 pounds per pound of $P_2O_5$ in the charge, and blasting the charge with a blast of hot air which has been oxygenated so as to contain not less than 30% of oxygen by weight.

ROBERT D. PIKE.